(12) United States Patent
Gaither

(10) Patent No.: US 8,677,034 B2
(45) Date of Patent: Mar. 18, 2014

(54) SYSTEM FOR CONTROLLING I/O DEVICES IN A MULTI-PARTITION COMPUTER SYSTEM

(75) Inventor: Blaine Douglas Gaither, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1428 days.

(21) Appl. No.: 11/413,824

(22) Filed: Apr. 28, 2006

(65) Prior Publication Data

US 2007/0255865 A1  Nov. 1, 2007

(51) Int. Cl.
*G06F 3/00* (2006.01)
*G06F 13/14* (2006.01)

(52) U.S. Cl.
USPC .............................. 710/36; 710/37

(58) Field of Classification Search
USPC ............................ 710/36; 709/216
See application file for complete search history.

(56) References Cited

U.S. PATENT DOCUMENTS

| | | | | |
|---|---|---|---|---|
| 4,862,354 | A | * | 8/1989 | Fiacconi et al. ............... 709/216 |
| 5,548,791 | A | * | 8/1996 | Casper et al. .................. 710/38 |
| 5,991,797 | A | * | 11/1999 | Futral et al. ................... 709/216 |
| 6,112,263 | A | * | 8/2000 | Futral .............................. 710/37 |
| 6,195,730 | B1 | * | 2/2001 | West ............................ 711/121 |
| 6,216,216 | B1 | * | 4/2001 | Bonola ........................... 712/28 |
| 6,591,309 | B1 | * | 7/2003 | Shah ................................ 710/2 |
| 2002/0112102 | A1 | | 8/2002 | Tarui et al. |
| 2006/0064523 | A1 | | 3/2006 | Moriki et al. |

FOREIGN PATENT DOCUMENTS

| | | |
|---|---|---|
| JP | 64-58045 | 3/1989 |
| JP | 5-257720 | 10/1993 |
| JP | 2002-215408 | 8/2002 |
| JP | 2004-535615 | 11/2004 |
| JP | 2006-85543 | 3/2006 |
| WO | WO 02/73405 | 1/2002 |

OTHER PUBLICATIONS

Japan Office Action, English translation, dated Mar. 15, 2010, 3 pages.

* cited by examiner

*Primary Examiner* — Titus Wong

(57) ABSTRACT

An I/O control system for controlling I/O devices in a multi-partition computer system. The I/O control system includes an IOP partition containing an I/O processor cell with at least one CPU executing a control program, and a plurality of standard partitions, each including a cell comprising at least one CPU executing a control program, coupled, via shared memory, to the I/O processor cell. One or more of the standard partitions becomes an enrolled partition, in communication with the I/O processor cell, in response to requesting a connection to the IOP cell. After a partition is enrolled with the I/O processor cell, I/O requests directed to the I/O devices from the enrolled partition are distributed over shared I/O resources controlled by the I/O processor cell.

20 Claims, 8 Drawing Sheets

SYSTEM FOR CONTROLLING I/O DEVICES IN A MULTI-PARTITION COMPUTER SYSTEM

BACKGROUND

Large symmetric multiprocessor (SMP) systems can have many partitions. Each partition runs either an operating system (O/S) image or a hypervisor image. Each of these partitions require I/O (input/output) services. Depending on the size of the partition, the associated I/O device interface for accessing storage, networking, or other I/O resources may not be efficiently utilized. Furthermore, the flexibility in partitioning these systems is reduced by the additional constraints of providing the required I/O connectivity to newly created partitions. For some operating systems, each partition may need several different types of I/O device interface. Some of these I/O device interfaces may be sparsely, if ever, used.

Hypervisor technology addresses the above concerns to some extent, but in large utility servers the efficacy of a system of running dissimilar workloads in the same hypervisor may be significantly diminished. Each hypervisor image becomes a large single point of potential failure, which can bring down multiple servers at one time, when a particular hypervisor fails or malfunctions. Finally, as increases in CPU density allow more and more threads and cores to be packed into a single chip, running a large number of guest images in a single hypervisor may not be viable from a reliability standpoint.

SUMMARY

A system and method are provided for handling I/O resources in a multi-partition computer system. Disclosed herein is an I/O control system which controls virtualized I/O devices in the multi-partition computer system. The I/O control system includes an IOP partition containing an I/O processor cell with at least one CPU executing a control program, and a plurality of standard partitions, each including a cell comprising at least one CPU executing a control program, which is coupled, via shared memory, to the I/O processor cell. One or more of the standard partitions becomes an enrolled partition, in communication with the I/O processor cell, in response to requesting a connection to the IOP cell. After a partition is enrolled with the I/O processor cell, I/O requests directed to the I/O devices from the enrolled partition are distributed over shared I/O resources controlled by the I/O processor cell.

DETAILED DESCRIPTION

The present system allows a number of partitions, each hosting an OS instance, or hypervisor partitions (each possibly hosting up to several OS instances, in a symmetric multiprocessor (SMP) system) to share a pool of devices while maintaining fault-tolerance. It is assumed that each of the partitions in the present system has some form of hardware-imposed isolation from the other partitions, so that a failure in one partition cannot directly affect another partition. The I/O demands of each of the partitions are distributed over relatively few shared I/O devices each connecting to I/O fabric links. These I/O fabric links may be SAN (storage area network) links such as Fibre Channel or LAN (local area network) links such as Ethernet. The present system thus requires relatively few I/O devices, while being able to handle large peak loads, as compared to a system inefficiently using a relatively large number of individual I/O subsystems.

Figure 1:
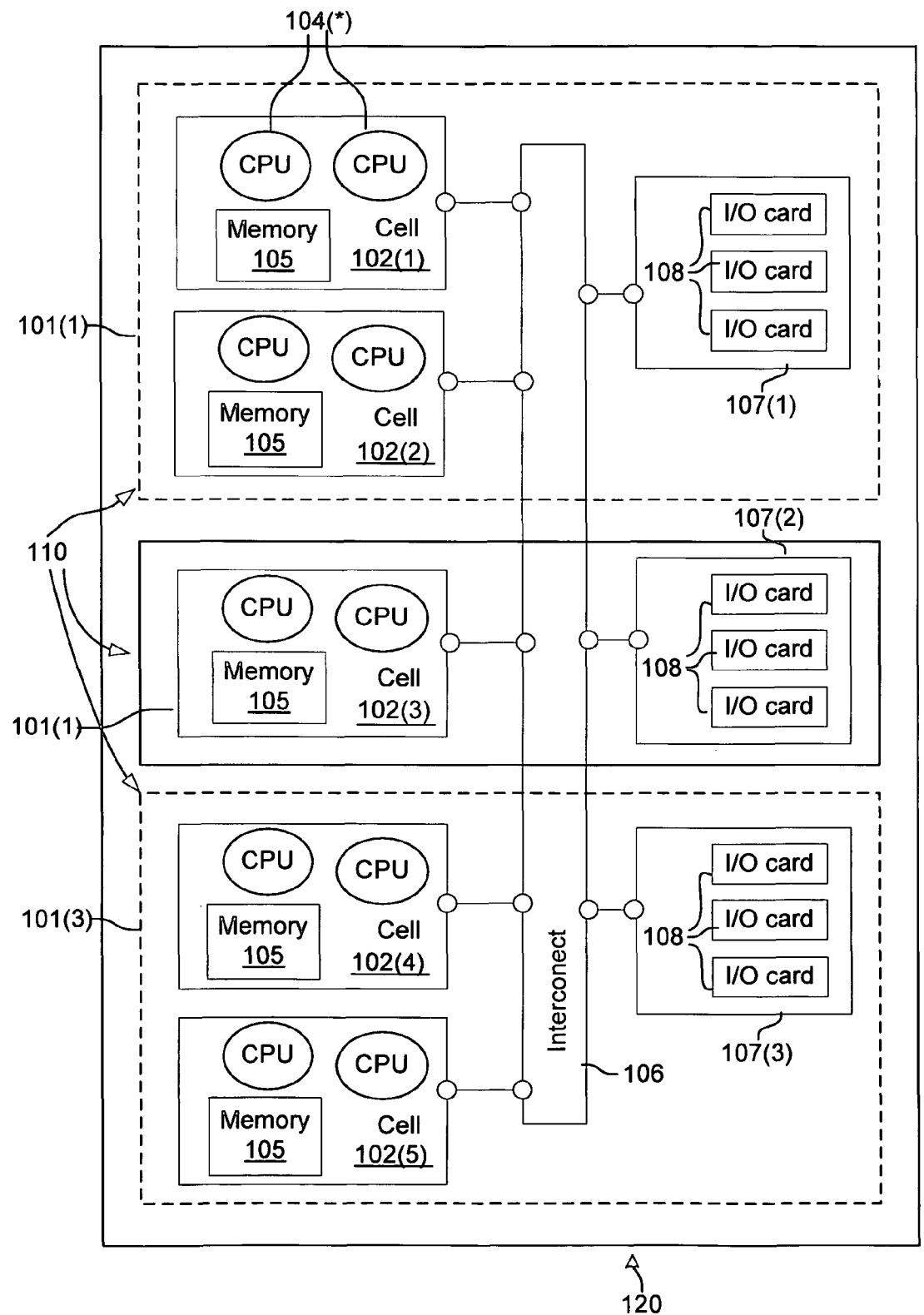
FIG. 1 shows two prior art systems—a system with hard partitions, and a hypervisor/O/S-managed system.

FIG. 1 shows two prior art systems—a system 110 with hard partitions 101(1), 101(2), and 101(3), and a single image SMP system 120 using a hypervisor to manage I/O requests (etc.) for partitions **101(*)** recognized by the corresponding hypervisor or operating system (O/S). In the present document, an asterisk in parentheses '(*)' following a reference number refers to one or more occurrences of the entity represented by the reference number, where a plurality of entities of the type thus designated may exist in at least one embodiment. In a hard-partitioned system, such as system 110, I/O requests from the partition are directed to target I/O devices via I/O cards **108(*) in I/O boxes 107(*). Each of these I/O cards 108(*) is a dedicated device with respect to I/O operations for a particular partition 101(*). It can thus be seen that the I/O cards 108(*) in I/O boxes 107(1), 107(2), and 107(3) are not shared among partitions 101(1), 101(2), and 101(3)**.

In a system that employs a hypervisor, such as system 120, the hypervisor runs virtual computers (called 'guests') within virtual partitions, each of which appear to the corresponding hypervisor or O/S as a standalone partition. For example, in the system shown in FIG. 1, a hypervisor may run in partition 101(1) and additional hypervisors may run in additional partitions, such as partition 101(2). In system 120, both of these partitions are virtual, rather than hard, partitions. In either type of system 110/120, each partition **101(*) comprises one or more cells 102(*), each of which includes one or more CPUs 104(*), cell memory 105, and a memory controller, typically on a single card. Each cell 102(*) in a partition 101(*) is interfaced with system I/O devices 111 via an interconnect 106**, typically through the system backplane, or through other interconnect means, such as a bus or crossbar.

In a system employing one or more partitions hosting hypervisors or O/S images, a fixed number of I/O devices are dedicated to each partition **101(*)** in which a particular hypervisor or O/S image is running. If two or more partitions exist within a particular system, each partition may employ a hypervisor, but the hypervisors do not coordinate the sharing of system I/O resources between the partitions. Each of the hypervisors may virtualize I/O operations for their own guest O/S images, but they do not coordinate to share I/O between separate hypervisor instances. Presently, there may be several different hypervisors, each from a different vendor, concurrently running in the same system. For example, Microsoft applications may run under a Microsoft-supplied hypervisor, Linux images may run under the Zen O/S, and HP-UX images may run under HP-VM. In addition, economic forces in the industry such as licensing costs may require the presence of several hypervisor images on a system in order to minimize the number of CPUs for which licenses must be purchased.

Figure 2:
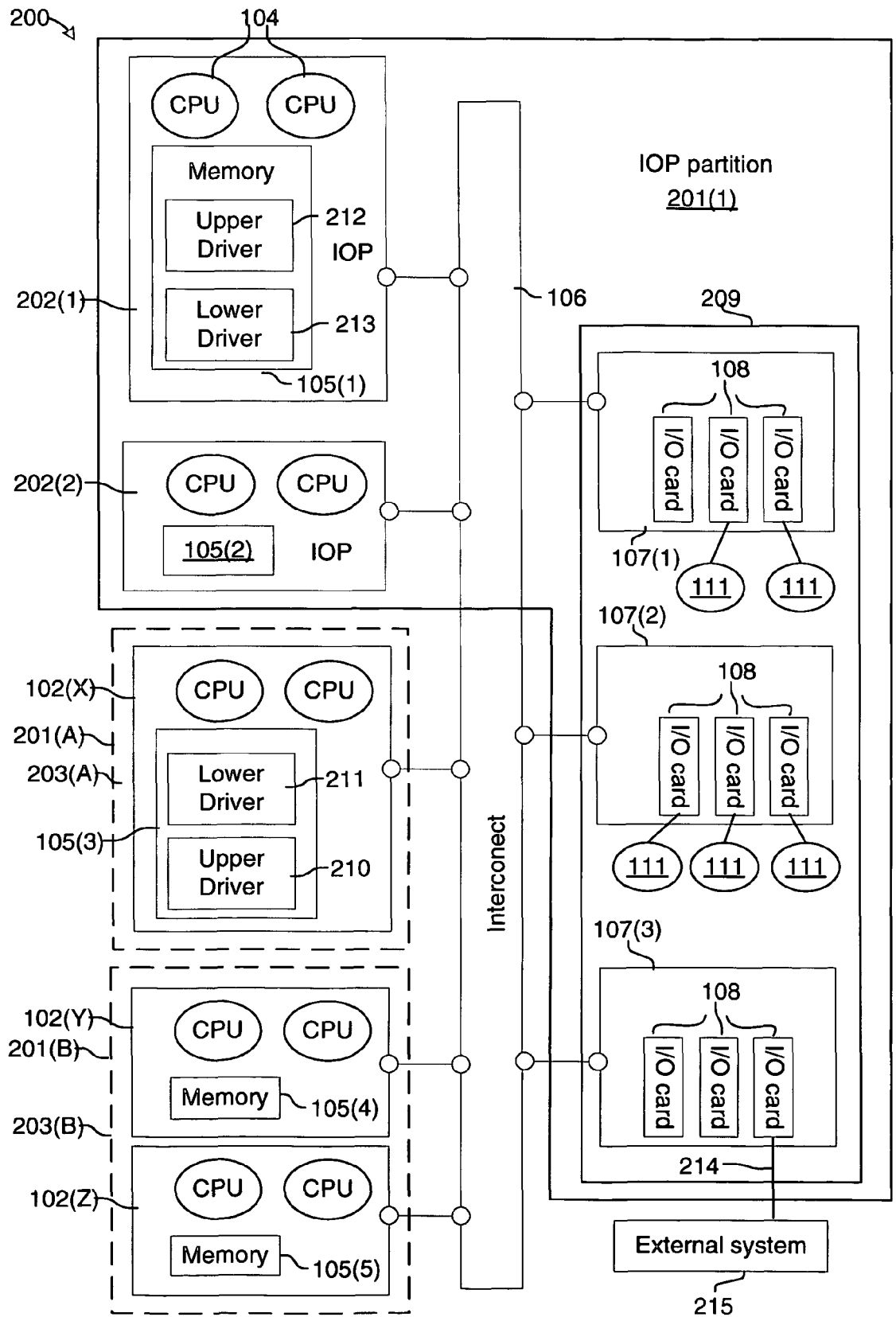
FIG. 2 is a block diagram of an exemplary embodiment of the present system, showing two IOP cells.

FIG. 2 is a block diagram of an exemplary embodiment 200 of the present system, showing two I/O processor (IOP) cells 202(1) and 202(2), hereinafter referred to as simply 'IOPs'. IOPs 202(*) are provided to manage the operation of system-shared I/O resources comprising virtual I/O devices. A virtual I/O device (or simply 'virtual device') is a logical entity to or through which I/O operations are directed or channeled, including logical representations of I/O devices that correspond to arbitrary physical devices 111. Thus, a virtual device may be a quasi-logical entity, such as a file or a communications channel, an arbitrary one of a group of similar physical devices, or a subset of a physical device, such as a partition on a disk drive.

IOPs 202(*) account for usage of I/O bandwidth and manage end user service levels, thus allowing allocation of new partitions independent of I/O slot and bus availability. In addition to storage and network management, an IOP 202(*) may also offer disk caching and security services. As shown in FIG. 2, IOP 202(1) is running in IOP partition 201(1), and separate O/S images and/or hypervisors are running in 'standard partitions' 201(A) and 201(B). The term 'standard partition' is used hereinafter to refer to either a partition running a hypervisor or a partition running a standalone copy of an O/S, either of which referred to herein as a control program. A control program does not include images either running as virtual machine guests, or running under control of a hypervisor. Partition 201(A) includes a single cell 102(X), and partition 201(B) includes two cells 102(Y) and 102(Z), although the number of cells in any given partition is not limited to these particular values.

The present system provides shared virtual I/O devices to one or more 'enrolled' standard partitions. The use of these shared virtual devices allows the allocation of resources on a utility server or other type of system to be is less constrained, thus allowing for increased efficiency in system I/O operation. A standard partition 201(*) must initially enroll with an IOP 202(*) in order to use the virtual devices provided by the IOP. The enrollment process includes the process of establishing a connection between a standard partition 201(*) and an IOP cell 202(*), and is described below with respect to FIG. 7.

In the present system, each IOP 202(*) includes an I/O driver subsystem, and each cell 102(*) in a partition 201(*) may also contain an I/O driver subsystem. In both cases, the I/O driver subsystem comprises two parts—an 'upper driver' 210 (for a cell in a standard partition) or 212 (for an IOP cell), and a 'lower driver' 211 (for a cell in a standard partition) or 213 (for an IOP cell). The upper driver 210/212 deals with the abstracted view of a device as seen by an application, for example, those characteristics which are common to all devices of that type (e.g., read, write, position, synchronize, etc.). The lower driver 211/213 is essentially a 'physical device driver', and provides the device and channel specific interfaces for interfacing to a specific device (e.g., SATA, SCSI, iSCSI, etc.), and drive specifics for a particular type of drive. I/O requests from enrolled partitions 203 to I/O drivers are directed to IOPs 202(*) via shared memory, described below.

In an exemplary embodiment, each IOP cell 202(*) includes one or more CPUs 104, and memory 105(*). A lower driver 213 and an upper driver 212 reside in memory 105(*) in each IOP cell 202(*). Each partition 201(*) one or more cells 102(*), each of which contain one or more CPUs 104 and memory 105(*). A lower driver 211 and an upper driver 210 also reside in memory 105(*) in at least one of the cells 102(*) in each partition 201(*).

IOP Partition 201(1) includes I/O boxes 107(1)-107(3) and their associated I/O cards 108. In the embodiment depicted in FIG. 2, IOP 202(1) may function as the I/O processor for (any number of) additional partitions, e.g., partitions 201(A) and 201(B), thus effectively controlling the I/O for each of the shared I/O devices 111 in I/O subsystem 209 connected via I/O boxes 107(1)-107(3).

When a particular partition 201(*) 'enrolls' with an IOP cell 202(*) [as described below with respect to FIG. 7], the partition 201(*) becomes an 'enrolled' partition 203(*). Thus, standard partitions 201(A) and 201(B) become 'enrolled partitions' 203(A) and 203(B) after enrollment with an IOP 202(*), such as IOP 202(1) in IOP partition 201(1). The present system provides generic storage and communication drivers for individual hypervisors and/or O/S images running in partitions 203(*), in which the hypervisors/images are resident. These hypervisors and O/S images communicate with, and provide I/O services in conjunction with, IOPs 202(*). Partitions 201(*) containing IOPs 202(*) are able to communicate with partitions 203(*) containing the hypervisors/images via the system backplane or other interconnect 106.

An IOP 202(*) provides virtualized I/O resources for each O/S or hypervisor partition 201(*). A virtual I/O subsystem including a virtualized storage and communications network interface is provided to each hypervisor or O/S image, once the partition 201(*) containing the hypervisor/O/S image has become an enrolled partition 203(*). Each virtual I/O subsystem provides a virtual device to a requesting enrolled partition, and handles I/O operations directed to a particular virtual device.

The embodiment shown in FIG. 2 also includes a second IOP cell 202(2) which may be employed as a back-up IOP for IOP 202(1), or which may be used as an I/O processor for additional partitions. In addition to the two IOPs 202(1)/202(2) shown in FIG. 2, supplementary IOPs 202(*) may also be present in other system configurations. Each IOP 202(*) runs a code set that accepts I/O requests, translates virtual device requests to physical addresses, and consolidates these requests on one or more of shared I/O fabric links 214 such as Ethernet or Fibre Channel, and sends an appropriate response to the requestor [i.e., the requesting enrolled partition 203(*)], while handling errors. Link 214, connected to external system 215, is an example of such a shared I/O fabric link.

IOPs 202(*) communicate with hypervisors and/or partitions 201(*) and 203(*) via a memory fabric or other fabric. This fabric can include a shared memory fabric of a hosting SMP (e.g., global shared memory 301), using either RDMA (remote direct memory access) or other memory-to-memory communications (global shared memory 301 is described below with respect to FIG. 3). Several IOPs can scan the same set of I/O requests, and other known techniques may be used to ensure that each requested I/O operation is performed by some IOP 202(*) if a particular IOP 202(*) (or its link) fails, another IOP will provide the requested I/O operation(s).

The integrity of each partition 201(*) in the present system is secured via a hardware 'firewall' or similar mechanism. This mechanism provides protection which prevents enrolled partitions from overwriting each other, and attempts to ensure that an error in one partition cannot cause another partition to fail. One aspect of this protection is that one partition cannot write into another partition except via global shared memory 301 (described below), all of which is not made accessible to all partitions.

Figure 3:
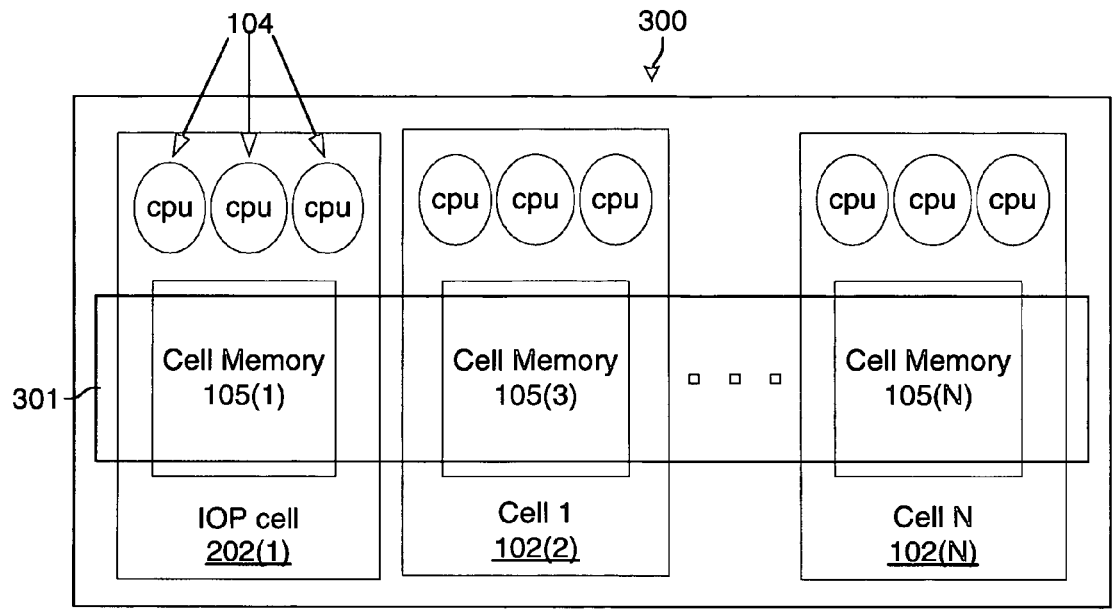
FIGS. 3 and 4 show physical and logical views, respectively, of the memory mapping in an exemplary embodiment.
Figure 4:
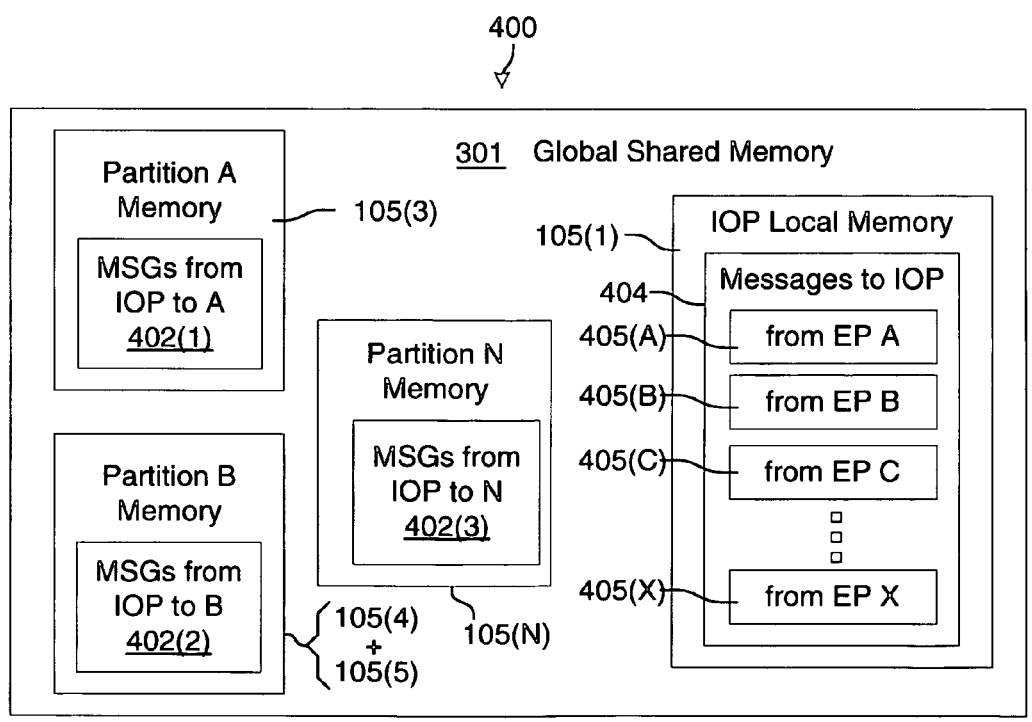

FIGS. 3 and 4 show physical and logical views, respectively, of the memory mapping in an exemplary embodiment of the present system. As shown in FIG. 3, physical memory map 300 indicates that at least part of the cell memory 105(1)-105(N) for each of the cells **102(\*) and 202(\*) in the present system is accessible to each of the other cells through global shared memory 301**.

Global shared memory 301 in the present system is not a physically separate memory, but rather a region of memory that is visible in the physical address space of more than one partition **201(\*) and 203(\*). Global shared memory 301 is (or can be) protected from unauthorized partition access and modification. Thus, although global shared memory 301 may actually reside as a portion of the memory present on more than one cell 102(\*) or partition 201(\*)/203(\*), for all practical purposes it functions as a distinct entity. In this sense global shared memory 301** is similar to, for example, memory shared between UNIX processes, where, within a single O/S partition, processes can be granted access to shared memory pages.

As shown in FIG. 4, a logical view 400 of memory mapping in an exemplary embodiment of the present system shows that global shared memory 301 can be regarded as being shared among, and thus accessible to, each partition in the system. Each IOP **202(\*) can thus communicate with each partition 201(\*)/203(\*), and vice-versa, through global shared memory 301, using 'mailboxes'. As shown in FIG. 4, global shared memory 301 includes enrolled partition ("EP") mailboxes 402(\*) in cell local memory and an IOP mailbox 404 in IOP local memory, which in turn contains a plurality of enrolled partition mailboxes 405(\*). IOPs 202(\*) check mailboxes for enrolled partitions 203(\*), and combine I/O requests with those from other partitions 203(\*)** to effectively utilize a relatively few high-bandwidth connections to storage or networking.

Figure 5:
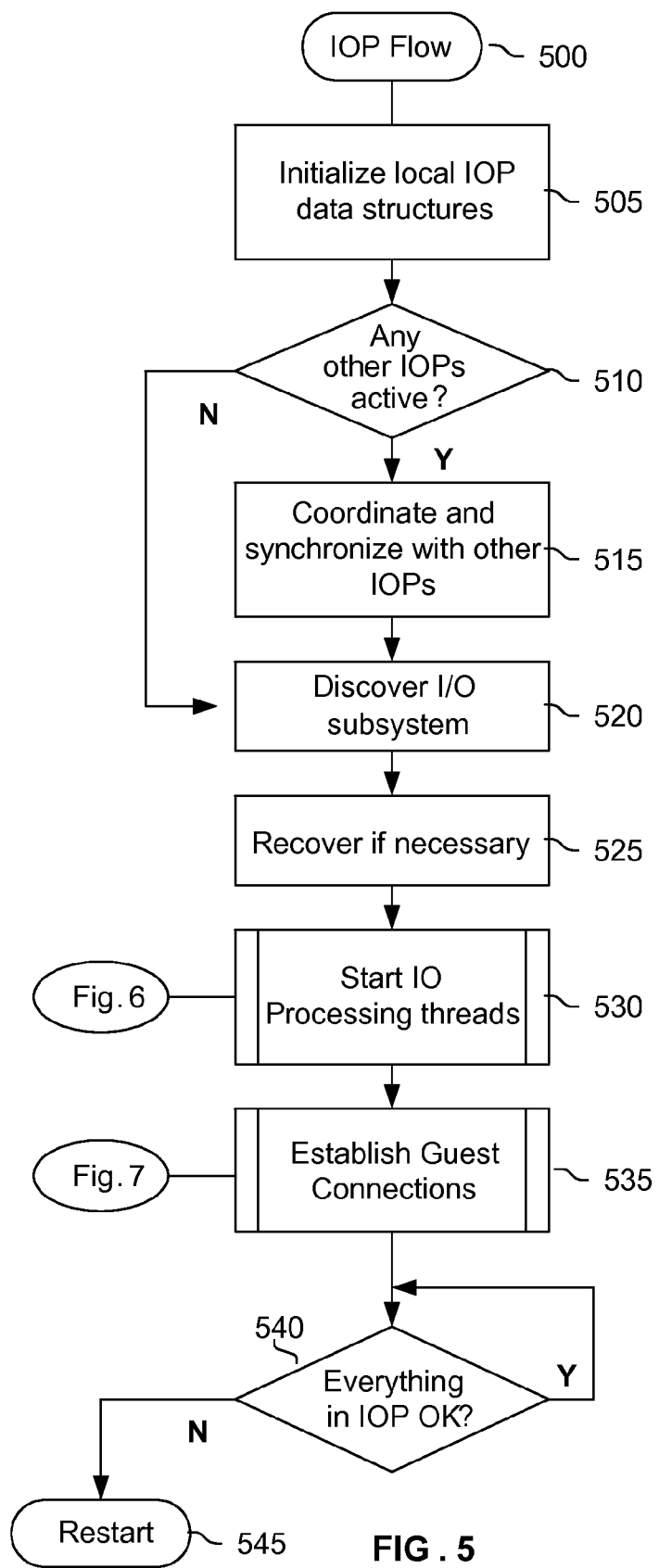
FIG. 5 is a flowchart showing an exemplary set of high-level steps indicating the information flow, with respect to an IOP, in an exemplary embodiment.

FIG. 5 is a flowchart showing a set of high-level steps indicating the information flow 500 with respect to (and performed by) an IOP, e.g., IOP 202(1), in an exemplary embodiment of the present system. As shown in FIG. 5, at step 505, local IOP data structures, such as local stacks and device queues, are initialized. At step 510, a check is made, via shared memory 301, to determine if any other IOPs are active. If so, at step 515, IOP 202(1) coordinates and synchronizes the other IOPs identified in step 510.

At step 520, I/O subsystem discovery is initiated to determine the presence of I/O cards 108 (and attached devices) in I/O subsystem 209. System recovery is performed, if necessary, at step 525, to ensure that the states of various system processes are current, and that I/O subsystem 209 is in proper communication and synchronization with the rest of the system. I/O processing threads are then initiated and handled in step 530, which is described immediately below with respect to FIG. 6. At step 535 (described below with respect to FIG. 7), connections are established between an IOP and standard partitions **201(\*). Finally, a self-check is made by each IOP 202(\*) at step 540 to determine if an IOP restart is necessary, and if so, the appropriate IOP is restarted, at step 545**.

Figure 6:
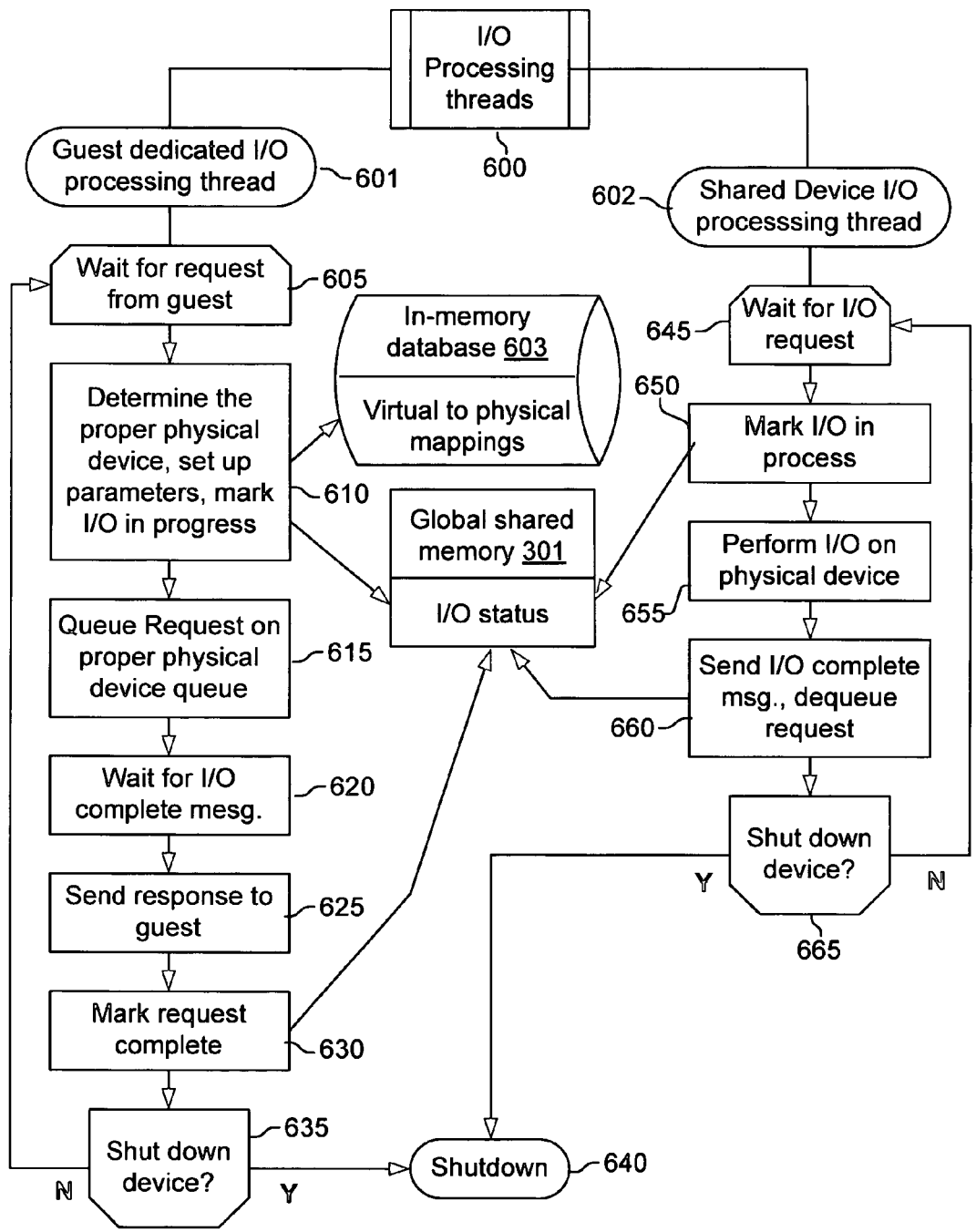
FIG. 6 is a flowchart showing an exemplary set of steps performed by an IOP to initiate and handle I/O processing threads.

FIG. 6 is a flowchart showing an exemplary set of steps performed by an IOP **202(\*) to initiate and handle I/O processing threads. As shown in FIG. 6, in step 600, two basic types of I/O processing threads may be initiated by an IOP in the present system—a device-specific/dedicated I/O processing thread 601, and a shared device I/O processing thread 602**. These threads may be threads for a virtual I/O device, if needed.

After device-specific I/O processing thread 601 has been started, the thread then waits, at step 605, for an I/O request from an enrolled partition **203(\*). When an I/O request from an enrolled partition 203(\*) is detected, for example, via an interrupt or a flag set in global shared memory 301, then at step 610, the proper physical device is determined and the I/O parameters for that device are set up (via in-memory database 603), and the I/O operation is marked as being 'in progress', via global shared memory 301**.

At step 615, the I/O request is then queued on a lower driver physical device queue appropriate to the specific device for which the requested I/O operation is to be directed. At step 620, thread 601 waits for a message from lower driver 213, which is detected via polling, or via a mechanism such as an interrupt or flag, indicating that the requested I/O operation has been completed. An 'I/O complete' response is then sent to the requesting enrolled partition 203, at step 625, and the I/O request is marked as complete, at step 630, via global shared memory 301. Then, at step 635, if device shutdown is indicated in the I/O request, then the I/O device is shut down, at step 640, otherwise thread 601 waits for the next I/O request from an enrolled partition **203(\*), at step 605**.

After shared I/O processing thread 602 has been started, then at step 645, the thread waits for an I/O request from upper driver 212. At step 650, the I/O operation is marked as being 'in progress'. Physical I/O is then performed on the requested device at step 655, via lower driver 213. At step 660, an 'I/O complete' message is sent to upper driver 212, and the pending I/O request is dequeued by thread 602, via global shared memory 301. Finally, at step 665, if device shutdown is indicated in the I/O request, then the I/O device is shut down, at step 640, otherwise thread 602 waits for the next I/O request from an enrolled partition **203(\*), at step 645**.

Figure 7:
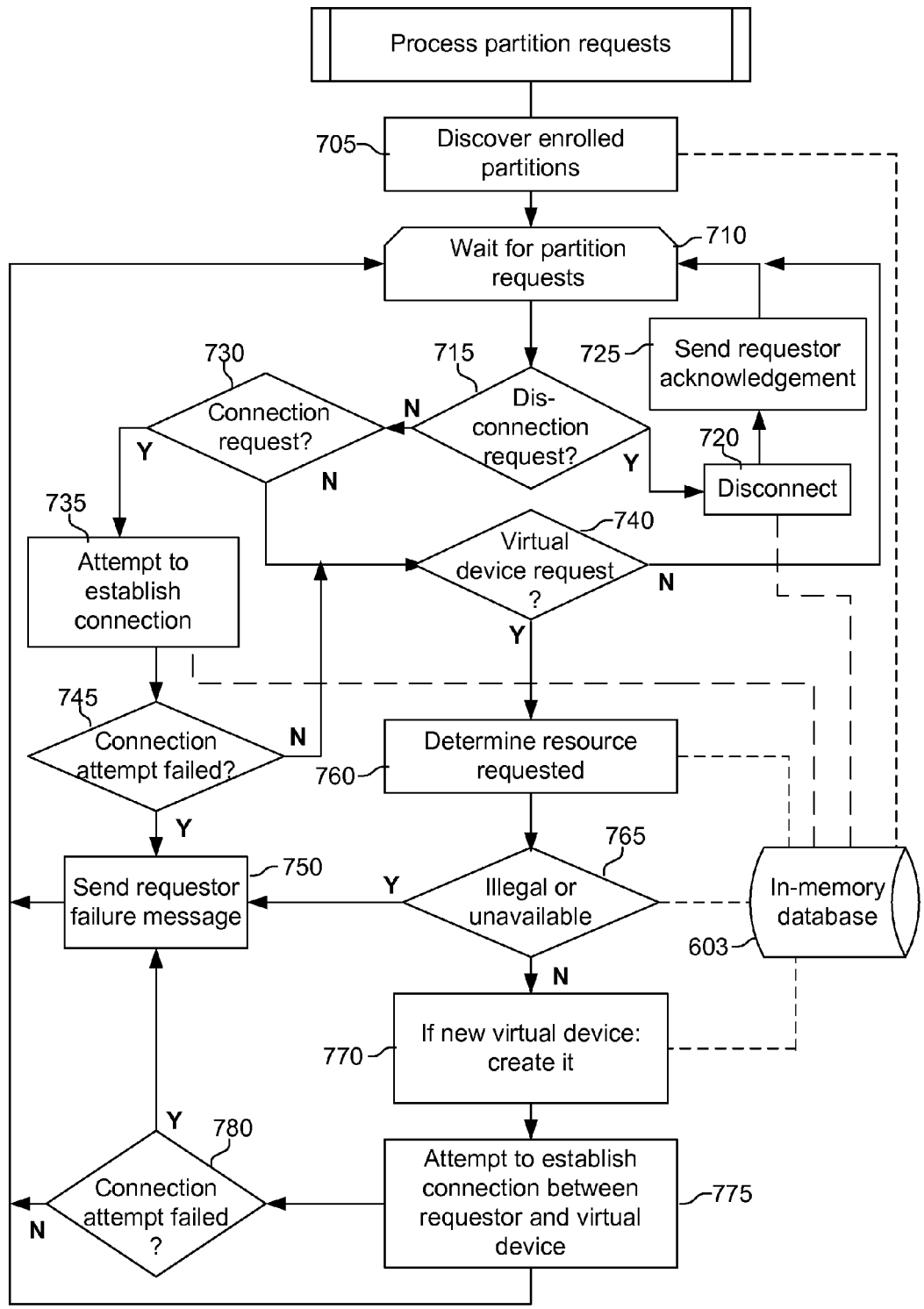
FIG. 7 a flowchart showing an exemplary set of steps performed by an IOP in processing requests from enrolled partitions.

FIG. 7 is a flowchart showing an exemplary set of steps performed by IOP 202(1) in processing requests from partitions, including establishing connections with standard partitions 201 (\*), taking down established connections, and handling virtual device requests from enrolled partitions 203 (\*). Although the description of FIG. 7 is presented specifically with respect to IOP 202(1), it should be noted that any IOP **202(\*) may perform the operations described herein. As shown in FIG. 7, at step 705, presently-enrolled partitions 203(\*) are discovered by checking in-memory database 603 for partitions that have enrolled with the IOP 202(1). Enrollment of a partition occurs when a connection request is made by a standard partition 201(\*) and the connection is successfully established, as indicated with respect to step 735**, described below.

In an exemplary embodiment, in-memory database 603 is an abstract data structure for storing IOP-related data, and includes lists of logical devices and networks, real devices, enrolled partitions and their corresponding privileges, virtual devices, physical devices, work in process, permissions, resources, and the like. A copy of in-memory database 603 may also be kept on disk or in non-volatile memory storage 903 (shown in FIG. 9).

At step 710, IOP 202(1) waits for a connection or disconnection request, or for a virtual device request, from an enrolled partition or a partition requesting enrollment, for example, partition 201(A). At step 715, a check is made to determine if there is a request for a disconnection. If so, the connection is terminated at step 720, via in-memory database 603, and a 'disconnect' acknowledgement is sent to the requestor at step 725, and IOP 202(1) then waits for the next connection request from a partition requesting enrollment, at step 710.

At step 730, if the requesting partition is already enrolled [for example partition 203(A)], then processing proceeds with step 740, described below.

If, at step 730, the request is determined to be a connection request, then at step 735, IOP 202(1) attempts to establish a connection with the requesting partition 201(A). If the connection attempt is successful, then the requesting partition 201(A) is enrolled by IOP 202(1) to become an enrolled partition (partition 203(A), in the present case), and a corresponding indication of the partition's enrolled status is stored in in-memory database 603.

At step 745, if the connection attempt failed, an error message is sent to the requestor at step 750, and IOP 202(1) then waits for the next request from an enrolled partition or a partition requesting enrollment, at step 710. If the connection attempt was successful (or if the partition is already enrolled, and processing is continuing from step 730), then at step 740, the request is checked to determine whether the request includes an I/O request directed to a virtual device. If the request includes a virtual device request, then processing continues at step 760, described below. Otherwise, IOP 202(1) waits for the next connection request from a partition requesting enrollment, at step 710. Note that the request is checked for a virtual device request at step 740, even if a connection request was received, since the connection request may also include a concurrent or embedded request for a virtual device as well.

At step 760, the requested resource (the requested I/O device) is determined from information contained in the request, and the existence and availability of the virtual device being requested is determined from information contained in in-memory database 603. If, at step 765, the virtual device request is not valid, or if the requested resource is unavailable, then an error message is sent to the requester, at step 750, and IOP 202(1) then waits for the next connection request from a partition requesting enrollment, at step 710.

If the request for a resource (I/O device) is valid, then at step 770, if the requested resource is a new virtual device (i.e., for a logical device that does not presently exist), then the requested virtual device is created. The newly-created virtual device is indicated in the in-memory database 603. At step 775, an attempt is made to establish a connection between the requesting partition 203(A) and the requested virtual device. At step 780, if the connection attempt failed, then an error message is sent to the requestor at step 750, and IOP 202(1) then waits for the next connection request from a partition requesting enrollment, at step 710.

Figure 8:
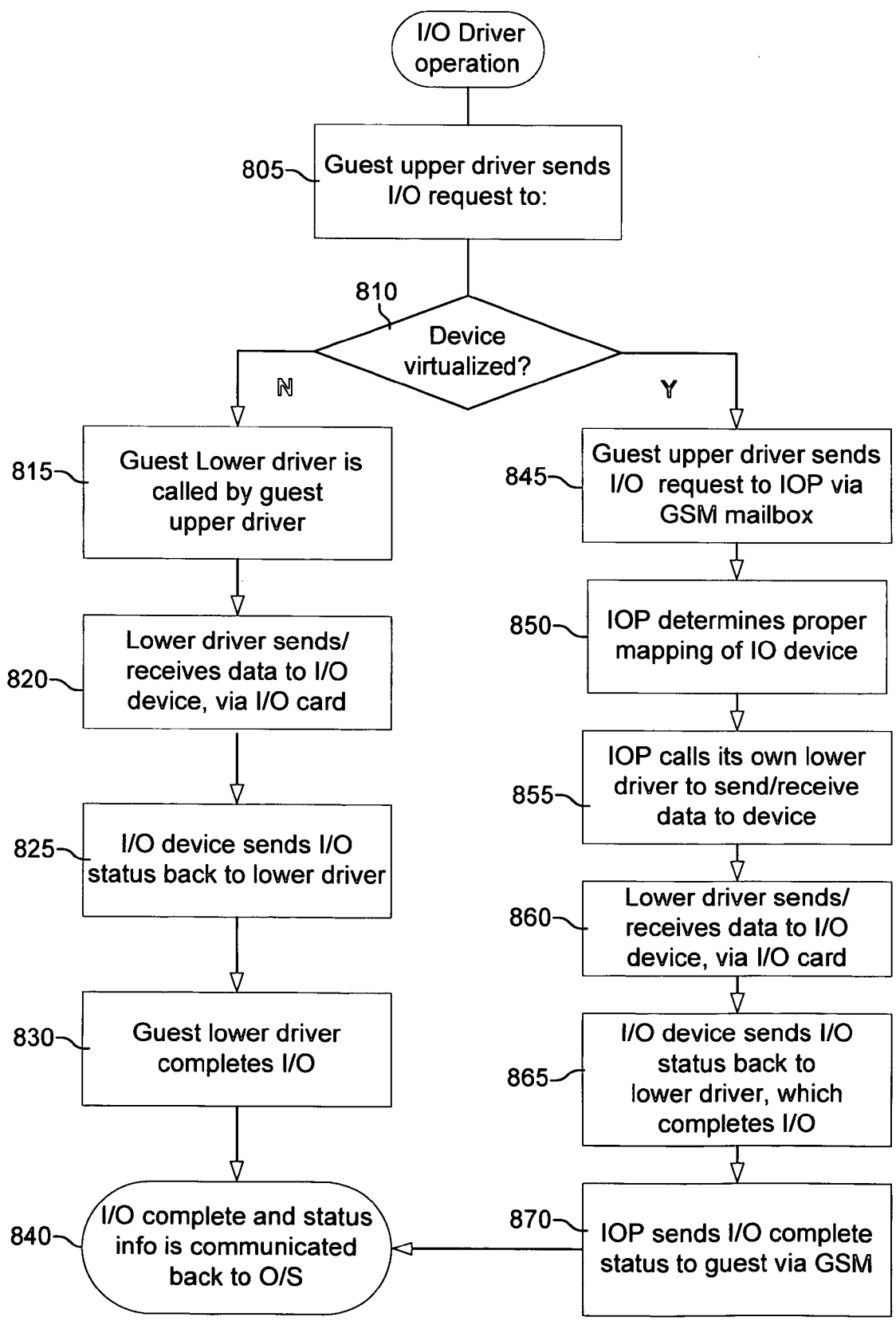
FIG. 8 a flowchart showing I/O driver data flow between an IOP and an enrolled partition, in an exemplary embodiment.

FIG. 8 is a flowchart showing I/O driver data flow between an IOP **202(\*) and an enrolled partition 203(\*), in an exemplary embodiment. As shown in FIG. 8, at step 805, an upper driver 210 in an enrolled partition, for example, partition 203(A), prepares to send an I/O request directed to a device that is either a virtual device or other ('non-virtual') device. A non-virtual device is essentially a 'local device', i.e., a device that is local to a particular partition 203(\*), and which can be driven directly from a driver (e.g., lower driver 211**) in that partition without IOP intervention.

At step 810, a determination is made as to whether the I/O request is directed to a virtual device or to a non-virtual device. If the request is for a non-virtual device, then an I/O call is then made, at step 815, from upper driver 210 to a lower driver 211 in the requesting enrolled partition 203(A). Alternatively, at step 845, the I/O request is sent to an IOP **202(\*)**, if the request is for a virtual device.

If the I/O request is for a non-virtual device, then, at step 820 the lower driver 211 performs data transfer with the appropriate I/O device 111, via the corresponding I/O card 108. The I/O device 111 then sends the I/O status back to lower driver 211 at step 825. Lower driver 211 completes the I/O operation, at step 830. Finally, at step 840, an 'I/O complete' indication and status information is communicated back to the O/S and the initiating process. Thus, an I/O request from a non-virtual device is treated as a 'normal' I/O operation.

If the requested device is a virtual device, then, at step 845, upper driver 210 sends the I/O request to an IOP, for example, IOP 202(1), via IOP mailbox 405(A) in global shared memory 301, which is set up during connection establishment. Then, at step 850, IOP 202(1) determines the proper mapping for physical card and device addresses. At step 855, the IOP calls its lower driver 213 using the mapping from the call made at step 850. At step 860, the lower driver send and receives data from the device via global shared memory 301. At step 865, the requested I/O device sends I/O status back to lower driver 213, and the lower driver completes the I/O operation At step 870, IOP 202(1) sends an 'I/O complete' status to EP mailbox 402(1) via global shared memory 301. Finally, at step 840, an 'I/O complete' indication and status information is communicated back to the O/S and the initiating process in the requesting partition 203(A).

Figure 9:
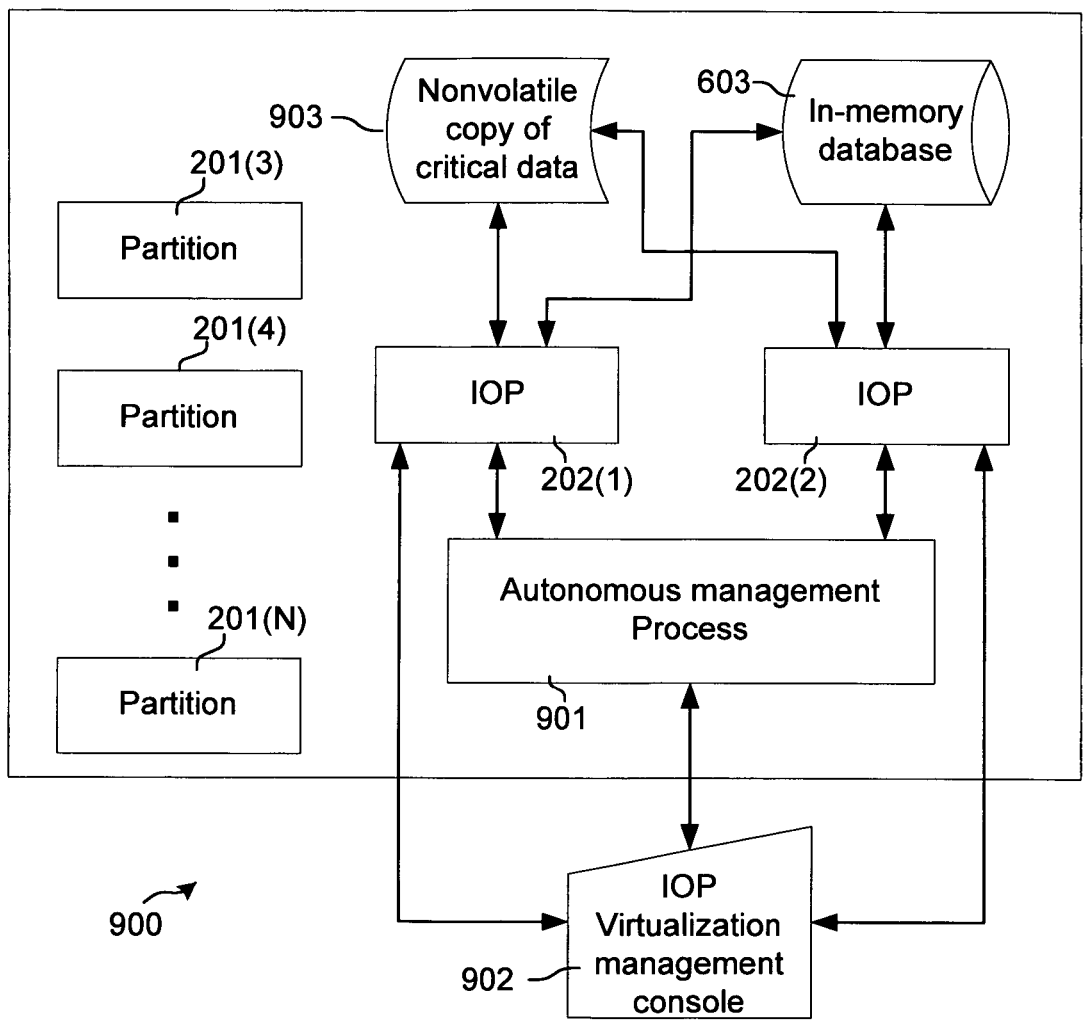
FIG. 9 is a block diagram of an exemplary embodiment of part of the present system, showing an IOP management subsystem.

FIG. 9 is a block diagram of an exemplary embodiment of one part of the present system, showing an IOP management subsystem 900, which functions as a management interface for communication between IOPs **202(\*) and I/O management software. IOP management subsystem 900 allows the specification of new virtual I/O subsystems and the enrollment and connection of hypervisors or partitions 203(\*) with IOPs 202(\*). Redundant IOPs, as indicated, for example, by IOPs 202(1) and 202(2), may be employed to increase system reliability. In an exemplary embodiment, reliability is further enhanced by maintaining a copy, on disk or in non-volatile memory storage 903, of critical data contained in in-memory database 603**.

A management interface can be, for example, a program running on a CPU 104 in an IOP **202(\*) or on an external workstation, such as IOP virtualization management console 902, which is connected to one or more IOPs (e.g., IOPs 202(1) and 202(2) in FIG. 9) via a network or other connection. In an exemplary embodiment, an autonomous management process 901 is coupled to IOP virtualization management console 902, as well as to each IOP 202(\*) in the present system. Autonomous management process 901 provides for the creation and management of virtual devices, and provides coordination among all system IOPs 202(\*), using input from IOP virtualization management console 902. IOP management subsystem 900 also enables tracking and accounting of I/O requests by enrolled partitions 203(\*)**, as well as providing overall IOP status and I/O link and device utilization information. Usage billing software, for example, may make use of this management and accounting information.

Certain changes may be made in the above methods and systems without departing from the scope of the present system. It is to be noted that all matter contained in the above description or shown in the accompanying drawings is to be interpreted as illustrative and not in a limiting sense. For example, the system shown in FIGS. 2, 3, 4 and 9 may be constructed to include components other than those shown therein, and the components may be arranged in other configurations. The elements and steps shown in FIGS. 5-8 may also be modified in accordance with the methods described herein, and the steps shown therein may be sequenced in other configurations without departing from the spirit of the system thus described.

What is claimed is:

1. An input/output (I/O) control system for use in a multi-partition computer system comprising:
   an I/O processor (IOP) partition comprising an IOP cell containing at least one CPU to execute a first control program; and
   a plurality of standard partitions, each including a cell comprising at least one CPU to execute a second control program, the plurality of standard partitions coupled, via shared memory, to the IOP cell;
   wherein at least one of the standard partitions is to become an enrolled partition in response to requesting a connection to the IOP cell;
   wherein, in response to a request from the enrolled partition, the IOP cell is to provide to the enrolled partition a virtualized I/O subsystem that controls I/O operations directed to a virtual I/O device including a logical entity; and
   wherein the enrolled partition includes a driver to: receive an I/O request; determine whether the I/O request is for the virtual I/O device or a non-virtual I/O device; process the I/O request in the enrolled partition without sending the I/O request to the IOP cell, in response to determining that the I/O request is for the non-virtual I/O device; and send the I/O request to the IOP cell, in response to determining that the I/O request is for the virtual I/O device.

2. The system of claim 1, wherein the enrolled partition is to send the I/O request to the IOP cell via the shared memory accessible to the enrolled partition and the IOP partition.

3. An input/output (I/O) control system for controlling virtual I/O devices in a computer system, comprising:
   an I/O processor (IOP) partition comprising an IOP cell containing at least one CPU to execute a first control program; and
   a plurality of enrolled partitions, each including a cell containing at least one CPU to execute a second control program, wherein each of the enrolled partitions is communicatively coupled to the IOP cell;
   wherein each of the enrolled partitions is initially a corresponding standard partition prior to requesting enrollment with the IOP cell;
   wherein, in response to I/O requests from the enrolled partitions, the IOP cell is to distribute the I/O requests over the virtual I/O devices in the computer system, each of the virtual I/O devices including a logical entity; and
   wherein a first one of the enrolled partitions includes a driver to: receive an I/O request; determine whether the received I/O request is for a virtual I/O device or a non-virtual I/O device; process the received I/O request in the first enrolled partition without sending the received I/O request to the IOP cell, in response to determining that the received I/O request is for a non-virtual I/O device; and send the received I/O request to the IOP cell, in response to determining that the received I/O request is for a virtual I/O device.

4. The I/O control system of claim 3, wherein the enrolled partitions are to communicate the I/O requests to the IOP cell via shared memory.

5. The I/O control system of claim 3, further comprising a mailbox in shared memory, accessible to the enrolled partitions and the IOP partition, to communicate the I/O requests for the virtual I/O devices from the enrolled partitions to the IOP cell.

6. The I/O control system of claim 3, wherein the I/O requests cause I/O operations to be directed to the logical entities of the virtual I/O devices.

7. The I/O control system of claim 3, further comprising an I/O driver subsystem, provided by the IOP cell, to control operation of the virtual I/O devices and distribute the I/O requests over the virtual I/O devices.

8. The I/O control system of claim 3, further comprising an autonomous management process, coupled to the IOP cell, to create and manage the virtual I/O devices.

9. The I/O control system of claim 8, including a plurality of IOP partitions, wherein the autonomous management process is to coordinate operation of the plurality of IOP partitions.

10. The I/O control system of claim 8, wherein the autonomous management process is to provide IOP cell status and I/O link and device utilization information.

11. A method for controlling virtual input/output (I/O) devices in a multi-partition computer system comprising:
   providing an I/O processor (IOP) partition comprising an IOP cell containing at least one CPU executing a control program;
   enrolling each of a plurality of standard partitions, each including at least one cell containing at least one CPU, in response to a request from a corresponding one of the standard partitions, to create a plurality of enrolled partitions communicatively coupled to the IOP cell;
   providing a virtualized I/O subsystem that handles I/O operations to the virtual I/O devices in response to I/O requests from the enrolled partitions, the virtual I/O devices including corresponding logical entities;
   receiving, by a driver in a given one of the enrolled partitions, an I/O request;
   determining, by the driver, whether the received I/O request is for a virtual I/O device or a non-virtual I/O device;
   processing, by the given enrolled partition, the received I/O request in the given enrolled partition without sending the received I/O request to the IOP cell, in response to determining that the received I/O request is for a non-virtual I/O device; and
   sending, by the driver, the received I/O request to the IOP cell, in response to determining that the received I/O request is for a virtual I/O device.

12. The method of claim 11, further comprising distributing the I/O requests over the virtual I/O devices in the computer system such that the I/O requests are distributed over shared I/O resources controlled by the IOP cell.

13. The method of claim 11, wherein said enrolling includes a request, by a standard partition, for a connection to the IOP cell.

14. The method of claim 11, further comprising communicating the I/O requests from the enrolled partitions to the IOP cell via shared memory.

15. The method of claim 14, wherein communicating the I/O requests occurs by way of a mailbox in the shared memory, accessible to the enrolled partitions and the IOP partition.

16. A method for controlling input/output (I/O) operations in a multi-partition computer system comprising:
   providing an I/O processor (IOP) partition comprising an IOP cell containing at least one CPU executing a control program;
   enrolling each of a plurality of standard partitions, each including at least one cell containing at least one CPU, in response to a request from a corresponding one of the standard partitions, to create a plurality of enrolled partitions communicatively coupled to the IOP cell;

providing a plurality of virtual I/O devices to the enrolled partitions in response to I/O requests from the enrolled partitions to the IOP cell, wherein the virtual I/O devices include corresponding logical entities;

communicating the I/O requests from the enrolled partitions to the IOP cell via shared memory;

distributing the I/O requests from the enrolled partitions over the virtual I/O devices in the computer system;

receiving, by a driver in a given one of the enrolled partitions, an I/O request;

determining, by the driver, whether the received I/O request is for a virtual I/O device or a non-virtual I/O device;

processing, by the given enrolled partition, the received I/O request in the given enrolled partition without sending the received I/O request to the IOP cell, in response to determining that the received I/O request is for a non-virtual I/O device; and sending, by the driver, the received I/O request to the IOP cell, in response to determining that the received I/O request is for a virtual I/O device.

17. The method of claim 16, wherein communicating the I/O requests occurs by way of a mailbox in the shared memory, accessible to the enrolled partitions and the IOP partition.

18. The I/O control system of claim 1, wherein the IOP cell is to:
   determine that a given request from the enrolled partition is for a particular virtual I/O device that does not yet exist; and
   in response to the determining, create the particular virtual I/O device.

19. The I/O control system of claim 1, wherein the virtualized I/O subsystem includes a virtualized storage and communications network interface.

20. The method of claim 16, further comprising:
   determining, by the IOP cell, that a particular one of the I/O requests is for a particular virtual I/O device that does not yet exist; and
   in response to the determining, creating the particular virtual I/O device.

* * * * *